United States Patent [19]
Motosyuku et al.

[11] Patent Number: 5,602,566
[45] Date of Patent: Feb. 11, 1997

[54] SMALL-SIZED INFORMATION PROCESSOR CAPABLE OF SCROLLING SCREEN IN ACCORDANCE WITH TILT, AND SCROLLING METHOD THEREFOR

[75] Inventors: Hiroshi Motosyuku; Hirobumi Yokosuka, both of Hitachi, Japan

[73] Assignee: Hitachi, Ltd., Tokyo, Japan

[21] Appl. No.: 294,503

[22] Filed: Aug. 23, 1994

[30] Foreign Application Priority Data

Aug. 24, 1993 [JP] Japan .................................. 5-209634

[51] Int. Cl.⁶ ........................................................ G09G 5/34
[52] U.S. Cl. ........................ 345/123; 345/156; 345/126
[58] Field of Search ..................................... 345/123, 124, 345/125, 126, 104, 173, 158, 168, 169, 156; 348/39; 382/312, 313, 293, 295, 296

[56] References Cited

U.S. PATENT DOCUMENTS

| | | | |
|---|---|---|---|
| 4,542,377 | 9/1985 | Hagen et al. | 345/126 |
| 4,786,895 | 11/1988 | Castaneda | 345/123 |
| 4,985,762 | 1/1991 | Smith | 348/39 |

FOREIGN PATENT DOCUMENTS

| | | | |
|---|---|---|---|
| 59-40116 | 3/1984 | Japan | 345/123 |
| 5216445 | 8/1993 | Japan | 345/123 |

*Primary Examiner*—Richard Hjerpe
*Assistant Examiner*—Xiao M. Wu
*Attorney, Agent, or Firm*—Antonelli, Terry, Stout & Kraus, LLP

[57] ABSTRACT

A small-sized information processor which is used while being held in one hand, and which can scroll a display screen in accordance with a tilt. When a scroll start switch is depressed, the tilt angle of a display unit at this time is detected as an initial tilt angle by a tilt sensor. When a predetermined time period has lapsed since the depression of the switch, the tilt angle of the display unit is detected as a second tilt angle by the tilt sensor. The initial tilt angle is subtracted from the second tilt angle by a processing unit, thereby calculating the relative tilt angle of the display unit. The processing unit scrolls the display screen of the display unit on the basis of the calculated relative tilt angle. The scrolling speed of the display unit may well be changed in accordance with the width of the relative tilt angle.

14 Claims, 8 Drawing Sheets

← FRONT OF TILT SENSOR

DIRECTIONS OF SMALL-SIZED INFORMATION PROCESSOR

TOP / UPPER SIDE / RIGHT SIDE

DIRECTION OF GRAVITIONAL PULL

FOR CLOCKWISE ROTATION

13 ⎍"1""0"⎍"1""0"⎍"1""0"
14 "1""0"⎍"1""0"⎍"1""0"⎍

FOR COUNTERCLOCKWISE ROTATION

13 ⎍"1""0"⎍"1""0"⎍"1""0"
14 "0"⎍"1""0"⎍"1""0"⎍"1"

SMALL-SIZED INFORMATION PROCESSOR CAPABLE OF SCROLLING SCREEN IN ACCORDANCE WITH TILT, AND SCROLLING METHOD THEREFOR

BACKGROUND OF THE INVENTION

The present invention relates to a small-sized information processor of the hand-held type which can be used while being carried. More particularly, it relates to an expedient for scrolling the display screen of such a small-sized information processor.

In scrolling the display screen of an information processor, there has heretofore been usually employed an operating method wherein the scrolling is started or stopped by actuating specified keys on a keyboard or entering a command input from a pointing device.

Besides, according to a technique disclosed in the official gazette of Japanese Patent Application Laid-open No. 52891/1985, the display screen of an information processor of the desktop type is mounted on a base so as to be turnable in any direction, whereby this display screen can be scrolled by turning it.

Also, in a case where a small-sized information processor is used while being held in one hand, a scrolling action needs to be performed using the other hand which is not holding the information processor, especially when looking at the content of an electronic publication or a document which has already been entered. Therefore, the operability of the small-sized information processor is problematic.

In this regard, the aforementioned technique of Japanese Patent Application Laid-open No. 52891/1985 concerns a desktop type information processor, and it is not applicable to an information processor which is used while being held in one hand.

SUMMARY OF THE INVENTION

The present invention has for its object to eliminate the problem stated above, and to provide a small-sized information processor which, when it is used while being held in one hand, permits a scrolling action that does not require any operation by the other hand.

In order to accomplish this object, according to the present invention, a small-sized information processor which has, at least, a display device provided with a display screen and which is used while being held in one hand, can comprise command input means for entering a command for scrolling the display screen, in the state in which the small-sized information processor is held in one hand; tilt detection means for detecting a relative tilt of the small-sized information processor with respect to a reference tilt thereof, taken to be the tilt at a point in time at which the scroll command is entered; and scroll means for scrolling the display screen on the basis of the relative tilt detected by the tilt detection means.

Besides, it is possible that the tilt detection means detects a tilt direction and a tilt angle of the small-sized information processor, and that the scroll means determines a scrolling direction of the display screen on the basis of the detected tilt direction, and a scrolling speed thereof on the basis of the detected tilt angle.

Further, it is possible that the command input means includes a switch which accepts the scroll command, and that the switch is mounted at a position at which it can be manipulated with a finger of the hand holding the small-sized information processor.

When the scroll command has been entered through the command input means (that is, when the scroll start switch has been depressed), the tilt direction and tilt angle of the display device at this time (the initial tilt direction and tilt angle) are detected as reference criteria by the tilt detection means (in other words, a tilt sensor). After a predetermined time period, the tilt direction and tilt angle (the second tilt direction and tilt angle) of the display device are detected by the tilt detection means. Subsequently, the relative tilt direction of the display device with respect to the reference tilt direction is judged, and the relative tilt angle thereof with respect to the reference tilt angle is calculated by subtracting the initial tilt angle from the second tilt angle. Thereafter, the scroll means scrolls the display screen of the display device on the basis of the relative direction and angle. The scrolling speed of the display screen may well be changed in accordance with the relative tilt angle.

PREFERRED EMBODIMENTS OF THE INVENTION

Figure 1:
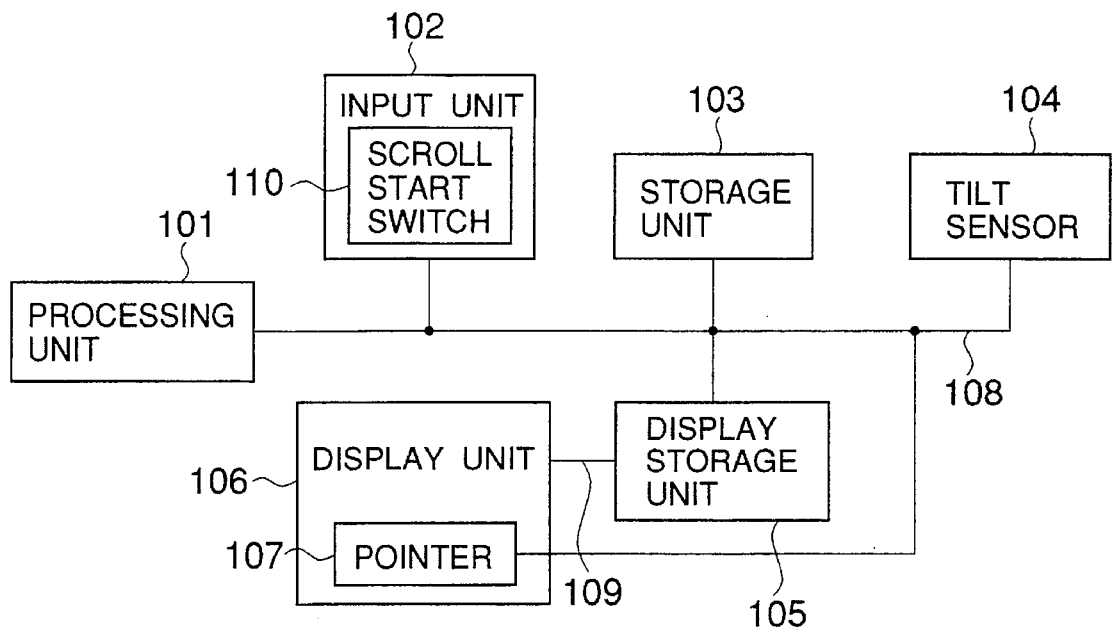
FIG. 1 is a block diagram showing an embodiment of a small-sized information processor according to the present invention.
Figure 2:
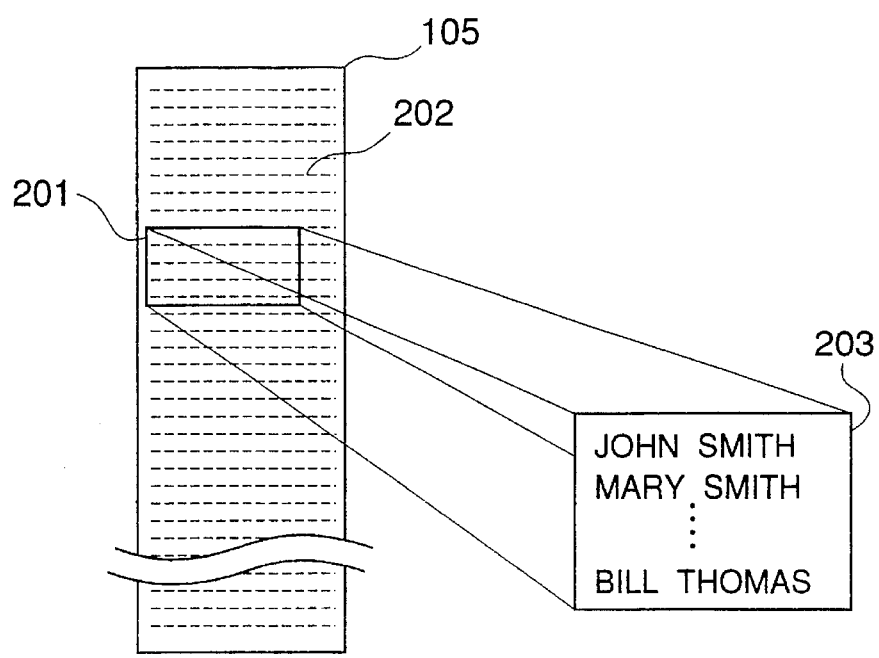
FIG. 2 is an explanatory diagram showing the pointer of a display unit, and the relationship between the display screen thereof and a display storage unit.
Figure 3:
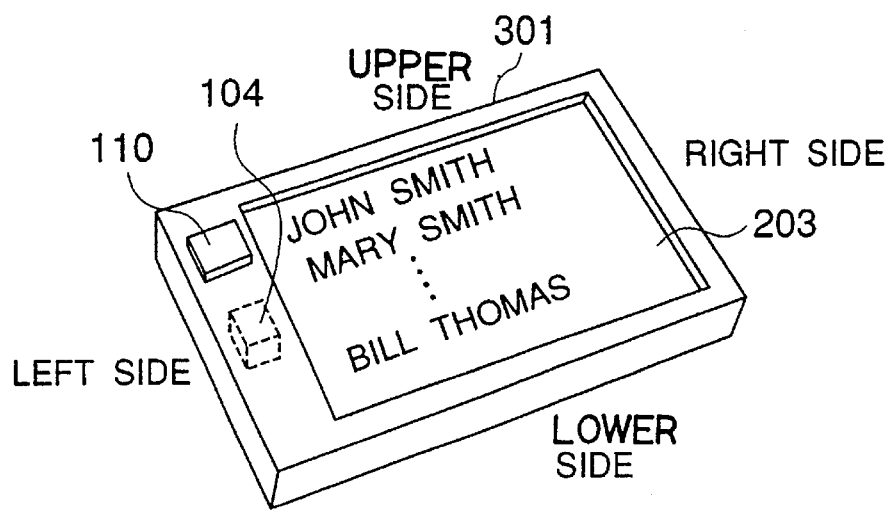
FIG. 3 is an exterior view of the small-sized information processor in the embodiment.
Figure 4:
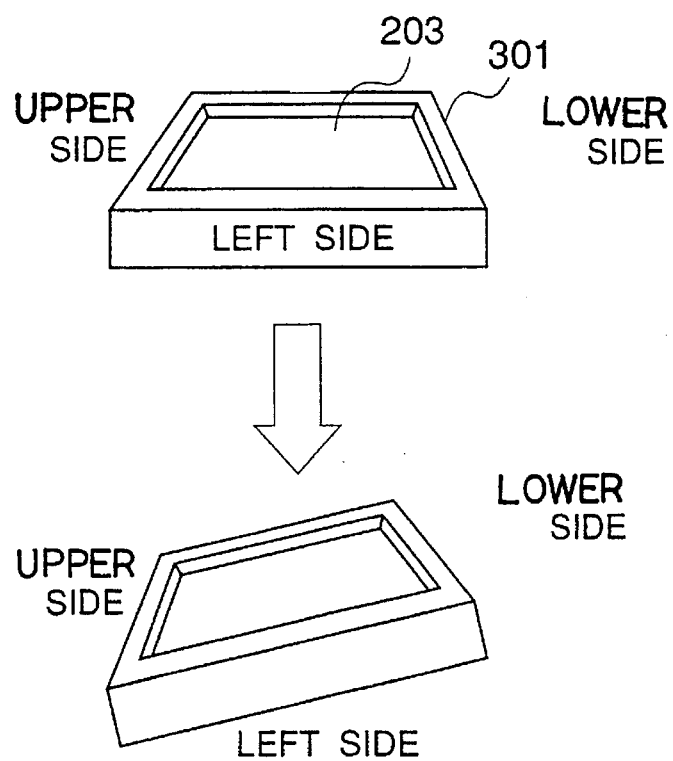
FIG. 4 is an explanatory diagram showing an operating method for upward scrolling.
Figure 5:
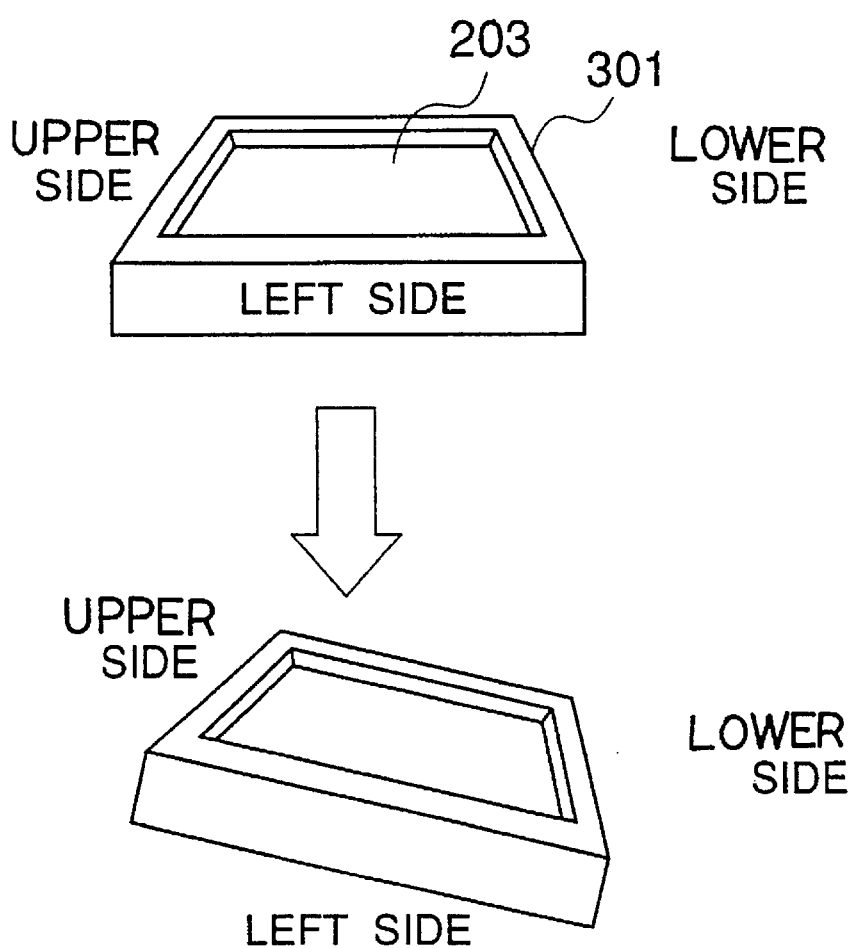
FIG. 5 is an explanatory diagram showing an operating method for downward scrolling.
Figure 6:
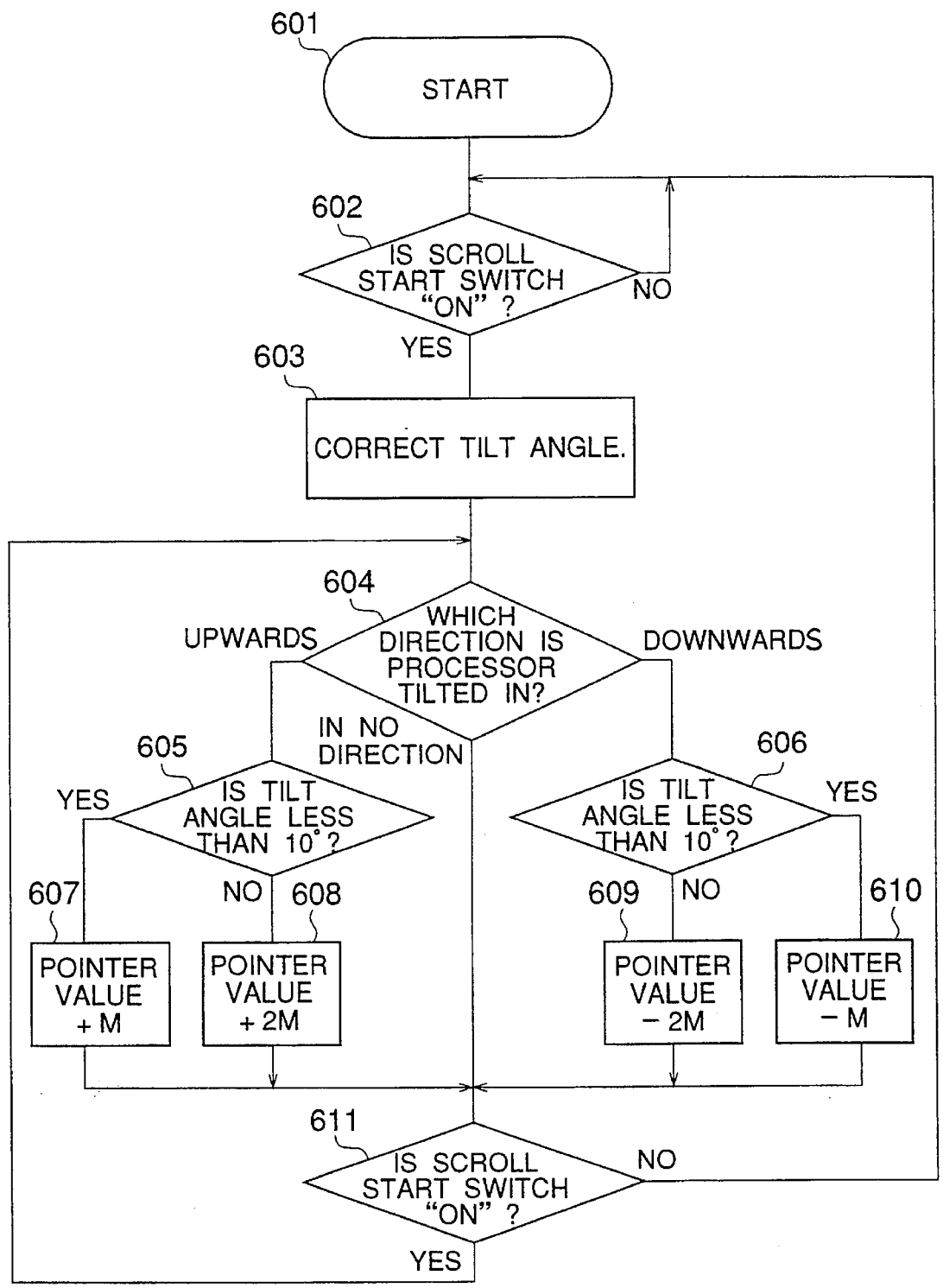
FIG. 6 is a flow chart showing the steps of a scrolling process.

Now, an embodiment of the present invention will be described with reference to FIGS. 1 thru 6. FIG. 1 is a block diagram of a small-sized information processor in the embodiment of the present invention. FIG. 2 is an explanatory diagram showing the operation of the pointer 107 (in FIG. 1) of a display unit (display device) 106, and the relationship between a display storage unit 105 and the display screen (exemplified at numeral 203 in FIG. 2) of the display unit 106. FIG. 3 is a view showing the external appearance of the small-sized information processor in the embodiment. FIG. 4 illustrates an operating method for the upward scrolling of the display screen 203, while FIG. 5 illustrates an operating method for the downward scrolling thereof. FIG. 6 is a flow chart showing the steps of a scrolling process.

Referring to FIG. 1, a processing unit 101 is connected to an input unit 102, a storage unit 103, a tilt (or inclination) sensor 104, the display storage unit 105 and the pointer 107 via a bus 108. The input unit 102 comprises data input means including a scroll start switch 110. The display storage unit 105 is connected to the display unit 106 by a display data readout line 109. As illustrated in FIG. 2, the display unit 106 reads one frame of display data 202 stored in the display storage unit 105, out of the storage location of the unit 105 pointed to by a pointer value 201 stored in the pointer 107, and it displays the read display data on the display screen 203 of the display unit 106. The display screen 203 can be scrolled up by incrementing the pointer value 201, whereas it can be scrolled down by decrementing the pointer value 201.

Referring to FIG. 3, the small-sized information processor generally designated by numeral 301 comprises the scroll start switch 110 and the display screen 203, which are exposed to the top thereof, and also the tilt sensor 104 which is mounted therein. The tilt (or inclination) angle of the small-sized information processor 301 (in other words, that of the display unit 106) is detected by the tilt sensor 104. The scroll start switch 110 is a pushbutton switch. This switch 110 maintains a command for scrolling the display screen 203 valid, as long as it is depressed. When the switch 110 is released from the depressed state, the scroll command is invalidated. As seen from the figure, the pushbutton switch 110 should preferably be mounted at a position at which it can be manipulated with the finger of one hand when the small-sized information processor 301 is used while being held in the hand. Incidentally, the four sides of the small-sized information processor 301 shall be defined as indicated in the figure.

FIG. 4 is a schematic view of the small-sized information processor 301 as seen from the left side thereof. When the small-sized information processor 301 is tilted (or inclined) upwards (or toward the upper side thereof) as shown in the figure, the display screen 203 is scrolled in the upward direction.

Likewise, FIG. 5 is a schematic view of the small-sized information processor 301 as seen from the left side thereof. In contrast to the above, when the small-sized information processor 301 is tilted downwards (or toward the lower side thereof) as shown in the figure, the display screen 203 is scrolled in the downward direction.

Referring back to FIG. 1, the storage unit 103 stores therein programs and data which serve to process data entered into the input unit 102 by the processing unit 101, and which can be written into and read out of this storage unit 103 through the bus 108 by the processing unit 101. When the scroll start switch 110 (refer also to FIG. 3) is depressed, the processing unit 101 starts the scroll process illustrated in FIG. 6. If necessary, the processing unit 101 in FIG. 1 can read the tilt angle from the tilt sensor 104 through the bus 108. The tilt angle is given in terms of degrees relative to the direction of gravitational pull. Besides, the pointer values 201 of the pointer 107 of the display unit 106 can be written through the bus 108.

Referring to FIG. 6, in the scroll process started at the step 601, the processing unit 101 (FIG. 1) waits for the input of the depression ("ON") of the scroll start switch 110 (FIGS. 1 and 3) at the scroll start switch input step 602. In the absence of the "ON" input, the switch input step 602 is iterated. Conversely, in the presence of the "ON" input, the flow of the scroll process is shifted to the tilt angle correction step 603. At this tilt angle correction step 603, the processing unit 101 makes a correction in which the tilt angle read from the tilt sensor 104 (FIG. 1) immediately after the "ON" input of the scroll start switch 110 is set at 0 (in other words, set as a reference angle). Owing to the correction, the extent in degrees of the upward or downward tilt of the small-sized information processor 301 (FIG. 3) relative to the tilt angle thereof assumed immediately after the "ON" input of the scroll start switch 110 can be detected by the subsequent steps 604 and 605 or 606. Therefore, the display screen 203 (FIG. 4 or FIG. 5) can be scrolled with respect to any desired angle assumed when the switch 110 is initially depressed. By the way, the tilt angle correction step 603 will be detailed with reference to FIG. 13 later. This step 603 is followed by the tilt direction detection step 604.

At the tilt direction detection step 604, the processing unit 101 judges whether the small-sized information processor 301 shown in FIG. 3 is tilted upwards as shown in FIG. 4, tilted downwards as shown in FIG. 5, or not tilted.

Subject to the judgement at the step 604, that the information processor 301 is tilted in no direction, the flow of the scroll process is shifted to the scroll start switch input process 611. This scroll start switch input process 611 has the same processing content as the scroll start switch input process 602.

Further, subject to the judgement at the step 604 that the information processor 301 is tilted in the upward direction, the flow of the scroll process is shifted to the tilt angle measurement step 605. At this tilt angle measurement step 605, the processing unit 101 decides whether or not the tilt angle of the information processor 301 is less than 10°. On condition that the tilt angle has been decided as being less than 10°, the pointer value 201 (in FIG. 2) is incremented by M (at the step 607) so as to scroll the display screen 203 (in FIG. 4) up one line. In contrast, on condition that the tilt angle has been decided as being at least 10°, the pointer value 201 is incremented by 2M (at the step 608) so as to scroll the display screen 203 up two lines. Regarding the magnitude M, the display screen 203 is scrolled up one line by submitting the pointer value 201 to the increment of this magnitude (+M) and is scrolled down one line by submitting the pointer value 201 to the decrement of this magnitude (−M).

The addend or subtrahend M of the pointer value 201 will be explained in more detail. One row (in other words, the effective width) of the display screen 203 of the display unit 106 is configured of M dots. On the other side, the pointer 107 designates the position of the display screen 203 (in other words, the dot position of the left upper end of a character to be displayed) in units of one dot. In order to scroll the display screen 203 up or down one line, accordingly, the M dots may be added to or subtracted from the pointer 107. Thus, the upward or downward scrolling is effected.

Still further, subject to the judgement at the tilt direction detection step 604 that the information processor 301 is tilted in the downward direction, the flow of the scroll process is shifted to the tilt angle measurement step 606. This tilt angle measurement step 606 has the same processing content as the tilt angle measurement step 605. On condition that the tilt angle has been decided as being less than 10° at the tilt angle measurement step 606, the pointer value 201 is decremented by M (at the step 610) so as to scroll the display screen 203 down one line. In contrast, on condition that the tilt angle has been decided as being at least 10° at the tilt angle measurement step 606, the pointer value 201 is decremented by 2M (at the step 609) so as to scroll the display screen 203 down two lines. After the scrolling at the step 607, 608, 609 or 610, the flow of the scrolling process is shifted to the scroll start switch input step 611. When there is no "ON" input of the switch 110 at the scroll start switch input step 611, the process flow is returned to the scroll start switch input step 602. Conversely, when there is "ON" input, the process flow is returned to the tilt direction detection step 604.

According to this embodiment, the display screen 203 can be scrolled by tilting the small-sized information processor 301, and the scrolling speed thereof can be rendered variable in accordance with the extent of the tilt angle. Moreover, since the relative tilt angle is detected with respect to the reference tilt angle assumed at the point of time when the switch 110 is turned on (in FIGS. 1 and 3), the scrolling can be started at any desired tilt angle of the small-sized information processor 301 (that is, no specified tilt angle need be set for starting the scrolling). By the way, in this embodiment, whether the display screen 203 is to be scrolled one line or two lines is decided, depending upon whether or not the angle, at which the small-sized information processor 301 has been tilted after the turning on of the switch 110, is less than 10°. However, this aspect of operation is a mere example, and the display screen 203 can be scrolled any desired number of lines in correspondence with any desired tilt angle by altering the threshold value in the case of deciding the extent in degrees of the tilt angle at the tilt angle measurement step 605 or 606, or by altering the incremental or decremental value M of the pointer value 201. Besides, although the single decisional angle of 10 is set for the comparisons at the tilt angle measurement steps 605 and 606 in FIG. 6, the scrolling speed of the display screen 203 can be changed more finely according to the extent of the tilt angle by setting two or more decisional angles for comparison.

Now, the construction and operation of the tilt sensor 104 shown in FIGS. 1 and 3 will be described in detail.

Figure 7:
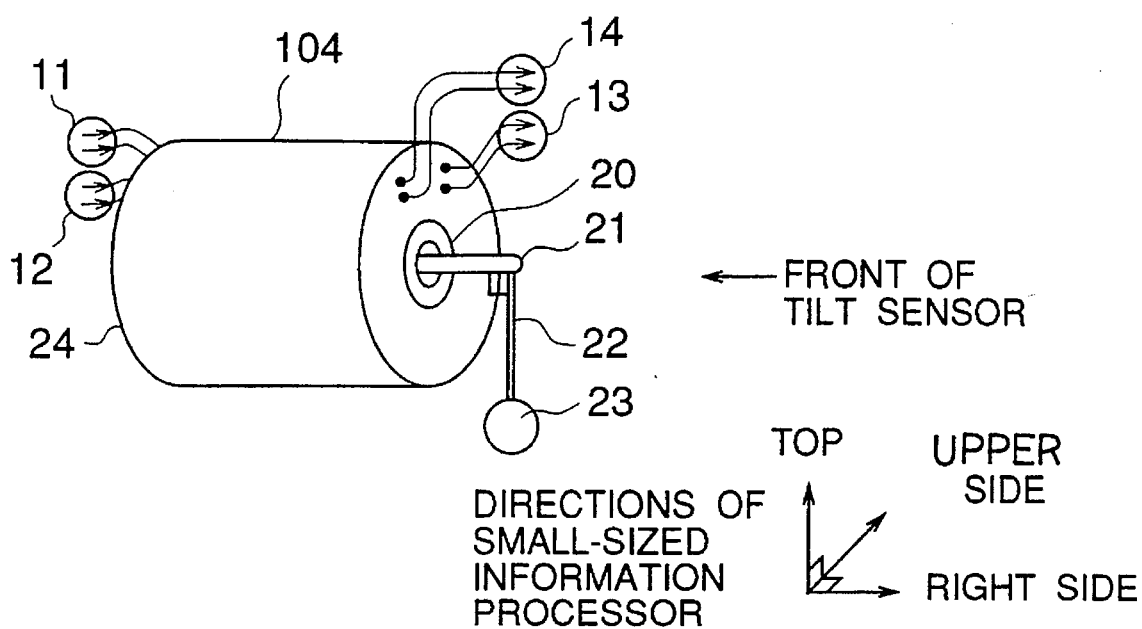
FIG. 7 is a view showing the external shape of a tilt sensor.
Figure 8:
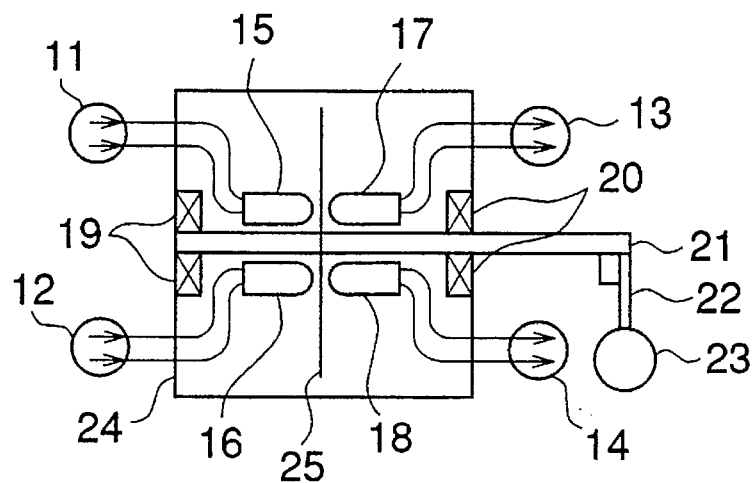
FIG. 8 is a view showing a vertical section of the tilt sensor.
Figure 15:
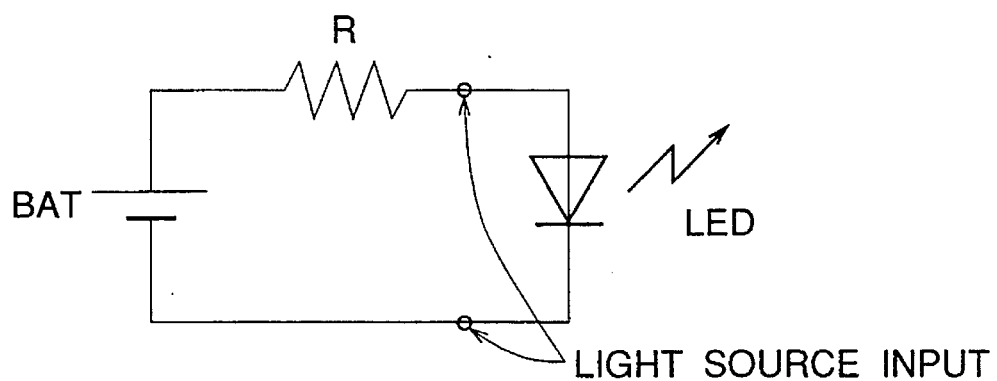
FIG. 15 is a diagram for explaining a light source and a light source input.

FIG. 7 is a view showing the external shape of the tilt sensor 104, while FIG. 8 is a view showing a vertical section of this tilt sensor 104. In FIGS. 7 and 8, the same reference numerals indicate identical constituent elements. The tilt sensor 104 receives a light source *A input 11 which is connected to a built-in light source *A 15, and a light source *B input 12 which is similarly connected to a built-in light source *B 16. A light emitting diode (LED) or the like can be used as each of the light sources *A 15 and *B 16. The light source *A input 11 and light source *B input 12 are means for illuminating (or turning ON) or extinguishing (or turning OFF) the respective light sources *A 15 and *B 16. The light source and the light source input are exemplified in FIG. 15. In this figure, symbol "BAT" denotes a D.C. (direct-current) power source, and symbol "R" a current limiting resistor.

Besides, the tilt sensor 104 delivers an output 13 from a built-in photosensor *A 17 and an output 14 from a built-in photosensor *B 18. A rotary shaft 21 is journaled in bearings 19 and 20, and is free to rotate. The light sources *A 15 and *B 16, the photosensors *A 17 and *B 18, and the bearings 19 and 20 are contained and held in a case 24. Each of the bearings 19 and 20 is a doughnut-shaped bearing. A disc 25 and a weight fixing bar 22 are fixed to the rotary shaft 21. A weight 23 is fixed to the distal end of the weight fixing bar 22. The weight 23 is normally gravitated vertically downwards. Thus, the weight fixing bar 22, rotary shaft 21 and disc 25 are rotated in unison.

Figures 9, 10, 11:
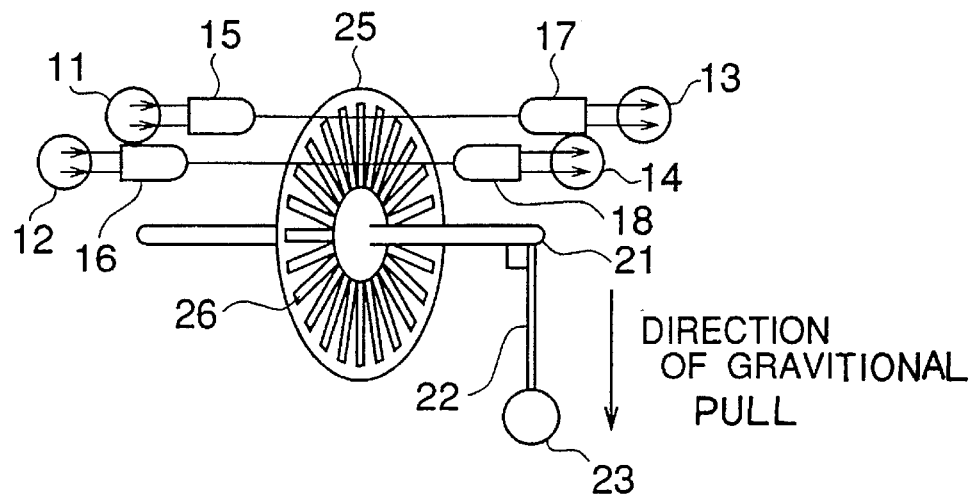
FIG. 9 is a view showing the internal construction of the tilt sensor.
FIG. 10 is a diagram for explaining the outputs of photosensors for the clockwise rotation of the tilt sensor.
FIG. 11 is a diagram for explaining the outputs of the photosensors for the counterclockwise rotation of the tilt sensor.

FIG. 9 is a view for explaining the internal construction of the tilt sensor 104. In FIG. 9, the same reference numerals as in FIGS. 7 and 8 indicate identical constituent elements. A light beam emitted from the light source *A 15 passes through slits 26 formed in the disc 25. The light beam is detected by the photosensor *A 17, and is produced as the photosensor *A output 13. Herein, it is assumed that the width of each of the slits 26 is equal to the width of a disc part lying between the respectively adjacent slits 26. When the small-sized information processor 301 containing the tilt sensor 104 therein has been tilted, the weight 23 having deviated from the vertically lower position thereof is gravitated vertically downwards to rotate the weight fixing bar 22, rotary shaft 21 and disc 25. The light beam from the light source *A 15 is intercepted when a part of the disc 25 other than the slits 26 crosses the optical axis of this light beam, and it falls on the photosensitive face of the photosensor *A 17 only when any slit 26 crosses the optical axis. The photosensor *A 17 generates a signal "1" as the photosensor *A output 13 while receiving the light beam, and it generates a signal "0" as the output 13 while not. In consequence, the output 13 of the photosensor *A 17 becomes a pulse train due to the rotation of the rotary shaft 21. The output 14 of the photosensor *B 18 responsive to the light source *B input 12 is produced similarly to the above.

Figure 14:
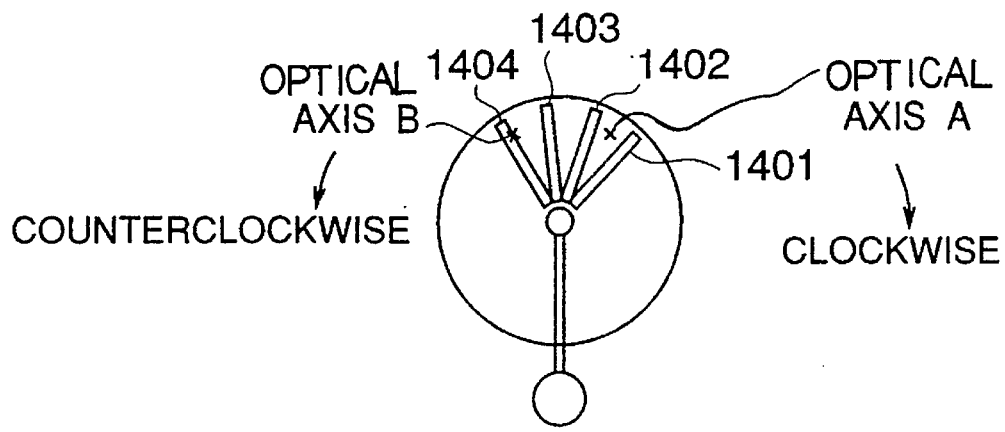
FIG. 14 is an explanatory diagram showing the relationship between the rotational directions of the tilt sensor and the output pulses of the photosensors.

By way of example, the optical axis of the light source *A 15 and photosensor *A 17 and that of the light source *B 16 and photosensor *B 18 are respectively set as indicated by letters A and B in FIG. 14 which is a schematic front sectional view of the tilt sensor 104 (refer also to FIG. 7). Then, the output 14 of the photosensor *B 18 becomes as shown in FIG. 10 in the case of clockwise rotation of the tilt sensor 104 as viewed from the front thereof, whereas it becomes as shown in FIG. 11 in the case of counterclockwise rotation of the same. These output signals 14 shown in FIGS. 10 and 11 have a phase shift of 90° therebetween. That is, whether the tilt sensor 104 is rotated clockwise or counterclockwise can be decided from the phase of the output signal 14 with respect to the output signal 13. Incidentally, as seen from FIGS. 10 and 11, the output 13 of the photosensor *A 17 does not change between the clockwise and counterclockwise rotations. Numerals 1401–1404 in FIG. 14 indicate individual slits which correspond to the slits 26 in FIG. 9.

Assuming in FIG. 9 that the number of slits 26 formed in the disc 25 is 48 (forty-eight), the output pulses of each of the photosensors *A 17 and *B 18 afford a resolution of 7.5° (360°/48) per pulse. The word "resolution" signifies the minimum rotational angle which can be detected. The rotational angle of the tilt sensor 104 can be calculated by counting the number of pulses. Although the resolution can be heightened by increasing the number of the slits 26, it becomes difficult for the photosensors *A 17 and *B 18 to detect the light beams when the slit width is too small. Especially in a case where the disc 25 has been reduced in size, such difficulties are more apparent. In order to cope with this drawback, a gear may be inserted between the rotary shaft 21 and the disc 25. For example, the resolution can be enhanced by double (that is, the detectable minimum rotational angle can be halved) by employing the gear through which the disc 25 is rotated two revolutions in accordance with one revolution of the rotary shaft 21.

Figure 12:
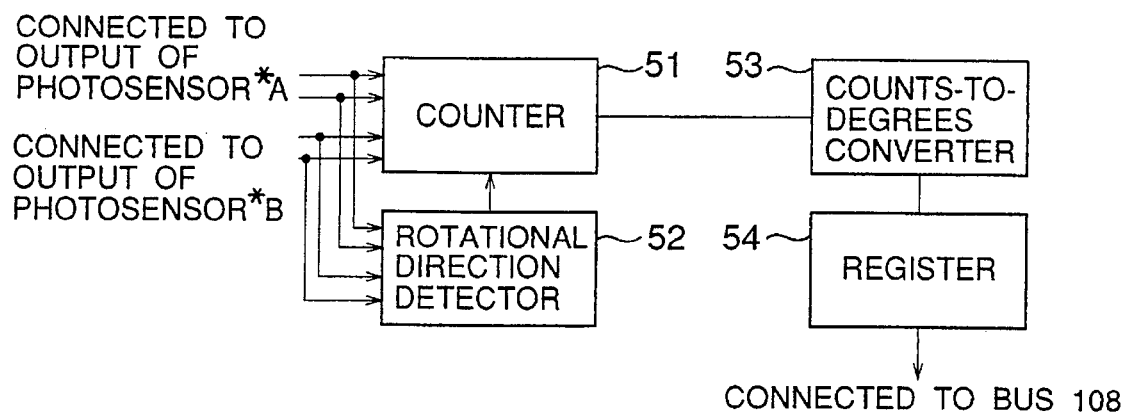
FIG. 12 is a diagram for explaining a method of measuring a tilt angle.

Next, a method of measuring the extent in degrees of the tilt angle from the outputs 13 and 14 of the respective photosensors *A 17 and *B 18 as shown in FIGS. 10 and 11 will be described with reference to FIG. 12.

A rotational direction detector 52 decides whether the output pulses of the photosensors *A 17 and *B 18 are in the phasic relationship shown in FIG. 10 or in the phasic relationship shown in FIG. 11, thereby discriminating whether the display screen 203 of the small-sized information processor 301 has been tilted downwards or upwards by the user thereof. Specifically, in the case where the directions of the small-sized information processor 301 are related to the tilt sensor 104, as indicated in FIG. 7, the upward tilt of the information processor 301 (as shown in FIG. 4) can be discriminated by the counterclockwise rotation of the disc 25, and the downward tilt thereof (as shown in FIG. 5) by the clockwise rotation of the same. The result of the discrimination is sent to a counter 51. The counter 51 counts up each time one output pulse is received, for the upward tilt direction given as the discriminated result, whereas it counts down for the downward tilt direction. The count content of the counter 51 is converted into the extent of rotation in degrees of the tilt angle on the basis of the aforementioned resolution by a counts-to-degrees converter 53, and the result of the conversion is stored in a register 54. The register 54 is connected to the bus 108 shown in FIG. 1. Incidentally, FIGS. 7 and 8 are depicted somewhat conceptually, and the circuit arrangement shown in FIG. 12 is actually included inside the case 24 of the tilt sensor 104.

Figure 13:
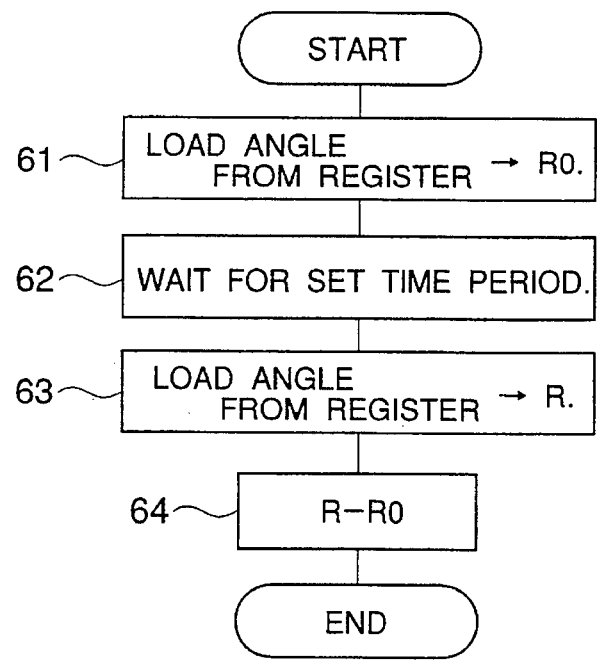
FIG. 13 is a flow chart showing the substeps of the tilt angle correction step (603 in FIG. 6)

FIG. 13 is a flow chart showing the detailed operation of the tilt angle correction step 603 (in FIG. 6). Referring to FIG. 13, at a substep 61, the processing unit 101 (in FIG. 1) loads the degree value of the tilt angle from the register 54 (in FIG. 12) and stores it in a register R0 (not shown) included in the storage unit 103 (in FIG. 1). At a substep 62, the processing unit 101 waits for a certain time period until the operator of the information processor 301 ends the tilting action after turning on the scroll start switch 110 (in FIG. 3). In this regard, the operability of the information processor 301 can be enhanced by setting the wait time period at any desired length and storing it in the storage unit 103. At a substep 63, the degree value of the tilt angle is further loaded from the register 54 and is stored in a register R (not shown) included in the storage unit 103. At a substep 64, an angular variation (R−R0) is calculated from the contents of the registers R0 and R, and it is determined as the tilt angle of the information processor 301.

By the way, this embodiment is so constructed that the display screen 203 is scrolled up and down by tilting the small-sized information processor 301 toward the upper side and lower side thereof, respectively. On the contrary, however, the display screen 203 may well be scrolled down and up by tilting the information processor 301 upwards and downwards, respectively. This aspect of operation can be implemented in such a way that the plus and minus signs of the incremental or decremental magnitude M or 2M of the pointer value 201 are reversed at the steps 607, 608, 609 and 610 of the flow chart shown in FIG. 6.

Moreover, although the upward and downward scrolling operations have been explained in this embodiment, rightward and leftward scrolling operations can be implemented on the basis of similar principles.

As described above, the present invention can provide a small-sized information processor which, when it is used while being held in one hand, permits a scrolling action without the need to use the other hand.

More specifically, according to the present invention, in scrolling a screen in the state in which the small-sized portable information processor is held in one hand, the screen can be scrolled in accordance with a tilt direction by tilting the small-sized information processor, and hence, the scrolling action need not be performed using the other hand in which the small-sized information processor is not held. It is accordingly possible to provide a small-sized information processor in which the screen can be scrolled easily even using one hand. The small-sized information processor demonstrates a favorable operability especially in case of looking at the content of an electronic publication or a document which has already been entered.

What is claimed is:

1. A small-sized information processor which has, at least, a display device provided with a display screen, and which is used while being held in one hand, comprising:

command input means for entering a command for scrolling said display screen, in the state in which said small-sized information processor is held in one hand;

tilt detection means for detecting a relative tilt of said small-sized information processor with respect to a reference tilt thereof assumed when the scroll command is entered; and scroll means for scrolling said display screen on the basis of the relative tilt detected by said tilt detection means.

2. A small-sized information processor according to claim 1, wherein:

said tilt detection means detects a tilt direction and a tilt angle of said small-sized information processor; and said scroll means determines a scrolling direction of said display screen on the basis of the detected tilt direction, and a scrolling speed thereof on the basis of the detected tilt angle.

3. A small-sized information processor according to claim 1, wherein said command input means includes a switch which, when actuated, initiates said scroll command, and said switch is mounted at a position at which it can be manipulated with a finger of the hand holding said small-sized information processor.

4. A small-sized information processor according to claim 3, wherein said switch is a pushbutton switch which maintains said scroll command valid while being depressed.

5. A small-sized information processor according to claim 1, wherein said tilt detection means detects a tilt direction with respect to said reference tilt, and said scroll means determines a scrolling direction of said display on the basis of the tilt direction detected by said tilt detection means.

6. A small-sized information processor according to claim 5, wherein said scroll means determines a scrolling speed of said display screen on the basis of said relative tilt.

7. A small-sized information processor according to claim 3, wherein said scroll means scrolls said display screen as long as said switch is depressed.

8. A scrolling method for a small-sized information processor which has, at least, a display device provided with a display screen, and which is used while being held in one hand, said method comprising the steps of:

entering a command for scrolling said display screen, in the state in which said small-sized information processor is held in one hand;

detecting a relative tilt of said small-sized information processor with respect to a reference tilt thereof assumed when the scroll command has been entered; and scrolling said display screen on the basis of the detected relative tilt.

9. A small-sized information processor which has, at least, a display device provided with a display screen, and which is used while being held in one hand, comprising:

command input means for entering a scrolling command for scrolling said display screen, in the state in which said small-sized information processor is held in one hand;

tilt detection means for detecting an angle of tilt of said small-sized information processor with respect to a reference plane substantially parallel to the display screen when said scrolling command is entered; and scroll means actuated by said scrolling command for controlling at least one of the speed and direction of scrolling of said display screen on the basis of the angle of tilt detected by said tilt detection means.

10. A small-sized information processor according to claim 9, wherein:

said tilt detection means detects a tilt direction and a tilt angle of said small-sized information processor; and said scroll means determines a scrolling direction of said display screen on the basis of the detected tilt direction, and a scrolling speed thereof on the basis of the detected tilt angle.

11. A small-sized information processor according to claim 9, wherein said command input means includes a manual switch which, when actuated, initiates said scroll command, said switch being mounted at a position at which it can be manipulated with a finger of the hand holding said small-sized information processor.

12. A small-sized information processor according to claim 9, wherein said switch is a pushbutton switch which maintains said scroll command valid while being continuously depressed.

13. A small-sized information processor according to claim 11, wherein said tilt detection means detects a tilt angle in terms of degrees relative to the direction of the pull of gravity.

14. A scrolling method for a small-sized information processor which has, at least, a display device provided with a display screen, and which is used while being held in one hand, comprising the steps of:

entering a scrolling command for scrolling said display screen, in the state in which said small-sized information processor is held in one hand;

detecting an angle of tilt of said small-sized information processor with respect to a reference plane substantially parallel to said display screen when said scrolling command is input; and controlling at least one of the speed and direction of scrolling of said display screen on the basis of the detected angle of tilt.

* * * * *